US007503135B2

(12) United States Patent
Chafin

(10) Patent No.: US 7,503,135 B2

(45) Date of Patent: Mar. 17, 2009

(54) MOBILE SIGN CARRIER

(75) Inventor: William Estill Chafin, P.O. Box 3012, Great Falls, MT (US) 59403

(73) Assignee: William Estill Chafin, Great Falls, MT (US)

( * ) Notice: Subject to any disclaimer, the term of this patent is extended or adjusted under 35 U.S.C. 154(b) by 385 days.

(21) Appl. No.: 11/392,822

(22) Filed: Mar. 29, 2006

(65) Prior Publication Data

US 2006/0218835 A1 Oct. 5, 2006

Related U.S. Application Data

(60) Provisional application No. 60/667,414, filed on Apr. 4, 2005.

(51) Int. Cl.

| | |
|---|---|
| ***G09F 21/04*** | (2006.01) |
| ***G09F 15/00*** | (2006.01) |
| ***G09F 15/02*** | (2006.01) |
| ***B60R 19/00*** | (2006.01) |
| ***B60R 7/00*** | (2006.01) |
| ***B60R 9/00*** | (2006.01) |
| ***B61F 19/00*** | (2006.01) |
| ***B61G 11/00*** | (2006.01) |

(52) U.S. Cl. .......................... 40/591; 40/610; 40/607.1; 40/607.4; 296/3; 224/405; 224/499

(58) Field of Classification Search .................. 40/591, 40/611.05, 610, 611–612; 224/489, 488, 224/405; 248/220.1, 221.11, 222.14

See application file for complete search history.

(56) References Cited

U.S. PATENT DOCUMENTS

| | | | | |
|---|---|---|---|---|
| 5,094,023 | A * | 3/1992 | McVey | 40/607.04 |
| 6,517,134 | B2 * | 2/2003 | Armstrong | 296/3 |
| 6,668,474 | B2 * | 12/2003 | Winterton et al. | 40/610 |
| 6,734,792 | B1 * | 5/2004 | McElveen | 340/468 |

* cited by examiner

*Primary Examiner*—Joanne Silbermann
*Assistant Examiner*—Syed A Islam

(57) ABSTRACT

A mobile sign carrier that mounts on a vehicle receiver hitch and method of use are provided. The mobile sign carrier has a base, a vertical piece and two cross pieces that fold down to form a cross shape. Four sliding brackets are provided, each having permanently attached a square, flat piece, which sliding brackets are mounted one each on each of the cross pieces and one each on the first end and the second end of the vertical piece. The sliding brackets are positioned and secured by means of a fastener to accommodate signs of different sizes. The mobile sign carrier provides a securing device for use on a vehicle with a tailgate. Safety chains further secure the vertical piece to the trailer hitch. A strobe light and night reflective tape are provided.

6 Claims, 3 Drawing Sheets

MOBILE SIGN CARRIER

This application references prior U.S. Provisional Application No. 60/667,414; filing date Apr. 4, 2005; applicant William E. Chafin; and, title Mobile Sign Carrier.

BACKGROUND OF THE INVENTION

1. Field of the Invention

The present invention relates to mobile signs and is particularly directed to a mobile sign carrier, used in work zones along highways, city streets and county roads.

2. Description of Related Art

Road construction signs and lane closure signs are well known ways to convey mobile work zone information to motorists. Traffic control devices like cones, barricades, candles and barrels, are known ways to direct traffic in work zones. It is labor intense to use barricades and larger sign stands that require moving and distributing such along streets and highways. Typical work zone signs can be portable and constructed of thin metal or fabric with a rigid border to retain shape when erected. A mobile sign carrier is a convenient method of erecting a typical metal or fabric work zone sign to convey information to motorists in a mobile work zone. Known examples of such signs are "Men Working", "Road Closed", "One Lane Road Ahead" or "Follow Me". With a vehicle mounted mobile sign carrier, as the work moves forward, the mobile work zone signage can move by moving the vehicle. With a strobe light and night reflective tape, the mobile sign carrier can be used as a nighttime temporary work sign or for emergency traffic situations.

The present invention advantageously provides a one-person apparatus and method of setting up a mobile metal or fabric temporary work zone sign. By incorporating a vehicle electrical system, the mobile sign carrier can provide flashing warning as well as be used at night. The mobile sign carrier is a lightweight apparatus that is space friendly for both use and storage. An advantage of one embodiment of the slide-on type base is that the vehicle trailer ball can still be use for towing other devices.

An example of a fold-up sign panel is disclosed by U.S. Pat. No. 6,606,809 (Hillstrom). Hillstrom teaches a sign stand having a foldable support mechanism for quickly and conveniently manipulating the sign panel from a deployed state to a folded state, including the foldable support mechanism having a hinge assembly coupling the upper and lower vertical brace members, horizontal brace members pivotally secured to the hinge assembly, and a latch mechanism for releasably retaining the foldable support mechanism in the deployed state.

U.S. Pat. No. 6,557,485 (Nathan) discloses a vehicle trailer hitch flag display apparatus. Nathan teaches an elongated flagstaff having a display flag attached or releasably attachable to an upper end portion and an elongated straight support shaft adapted to a lower end thereof to be releasably attachable to a trailer hitch in an upwardly extending and upright orientation in place of the towing ball when it is removed. Nathan further teaches a lower end of the flagstaff being slidably engageable over the support shaft in coaxial upwardly extending alignment with the support shaft and a releasable locking arrangement holding the flagstaff and the support shaft together while the apparatus is in use.

U.S. Pat. No. 5,810,542 (Ostrander) discloses a load securing device for a vehicle and methods of constructing and utilizing the same. Ostrander teaches a load securing device for a vehicle having a hitch mechanism securable to a vehicle for selectively fixing a trailer to the vehicle for being towed thereby, a load carrying mechanism for carrying loads externally of the vehicle, and a fastening mechanism for fastening the load carrying mechanism to the hitch mechanism such that both the load carrying mechanism and the hitch mechanism may be simultaneously used. Ostrander further teaches that the hitch mechanism is adjustable such that a trailer-engaging hitch member thereof may be stably disposed at different vertical levels relative to the vehicle, and the hitch mechanism is also adjustable such that the hitching member may be disposed at different longitudinally projecting positions relative to the vehicle. Ostrander further teaches that the load carrying mechanism is adjustable in longitudinal, lateral and vertical dimensions for securing different size and shape loads, and the fastening mechanism is adjustable for fastening the load carrying mechanism to the hitch mechanism in both an operative, erect position and a collapsed, storage position.

U.S. Pat. No. 5,011,361 (Peterson) discloses a vehicle mountable carrier for a three-wheeled scooter and the like. Peterson teaches a carrier mounted to a vehicle having a vertical piece with a power lift which moves a foldable platform between a lowered and a raised position, and which foldable platform assumes a folded position against the vertical piece when in raised position.

U.S. Pat. No. 4,381,069 (Kreck) discloses an outboard motor carrier for a motor vehicle. Kreck teaches a rigid metal support arm being pivotally mounted at its lower end in a bracket secured to an appropriate external structure such as a trailer hitch on a vehicle. Kreck further teaches that the bracket has a metal channel affixed to extend upwardly at an angle from the vertical to receive the lower end of the pivoted support arm that is secured in the channel with a locking pin or the like, with the upper end of the support arm being angled backward in the opposite direction and supporting a flat metal plate that is covered on both sides with attached flat wooden sheets to serve like a transom for attaching the clamps of an outboard motor.

None of the art as identified above, either individually or in combination, describes a mobile sign carrier or method in the manner provided for in the present invention.

SUMMARY OF THE INVENTION

It is an object of the present invention to provide a mobile sign carrier and method of erecting a metal or fabric mobile work zone sign that is a lightweight apparatus that is space friendly for both use and storage.

It is a further object of the present invention to provide a mobile sign carrier that can be used at night by incorporating a vehicle electrical system.

It is a further object of the present invention to provide a mobile sign carrier that a vehicle trailer ball can be incorporated into to be used for towing other devices.

In accordance with the teachings of the present invention, there is disclosed a mobile sign carrier for use with a vehicle in work zones along highways, city streets and county roads. The mobile sign carrier is made of tubing or other appropriate structural materials, and has a base that attaches to a receiver hitch on the vehicle. A typical receiver hitch on a vehicle has a framed opening mounted on and secured to the vehicle, and a receiver arm which slides into the framed opening and is fastened thereto by means of a pin or other fastening device. The receiver arm typically has mounted thereon a ball. In one embodiment, the base directly slides into the hitch framed opening and is fastened thereto. In another embodiment, the base provides for using the mobile sign carrier with a towing ball on the receiver arm, which base is slid over the receiver arm between the towing ball and the hitch framed opening and secured to the receiver arm with a fastener through pre-drilled holes in the side of the base, and which receiver arm with the secured base is then slid into the hitch framed opening and fastened thereto.

Both above-described embodiments of the base have a piece of tubing permanently attached to the top of the base with an opening on the top and pre-drilled holes on two sides. The mobile sign carrier has a vertical piece, which vertical piece has a first end that slides into the opening on the top of the base and attaches thereto by a fastener being placed through the pre-drilled holes through the base and a corresponding hole through the first end of the vertical piece, and a second end. Safety chains are provided, which safety chains are fastened to two sides of the vertical piece and mounted into a safety chain holder on the receiver hitch. A removable strobe light is provided, which removable strobe light is mounted on the second end of the vertical piece, and which removable strobe light is wired through a trailer connector at rear of the vehicle.

The mobile sign carrier has a first cross piece and a second cross piece, which first cross piece is attached to a first longitudinal side of the vertical piece, and which second cross piece is attached to a second longitudinal side of the vertical piece. The first cross piece is attached to the first longitudinal side of the vertical piece by a first hinge attached to the vertical piece and a first end of the first cross piece. When the first cross piece is folded upward against the vertical piece, the first cross piece lies parallel to the longitudinal axis of the vertical piece and a second end of the first cross piece and a second end of the vertical piece are even. The second cross piece is attached to the second longitudinal side of the vertical piece by a second hinge attached to the vertical piece and at a first end of the second cross piece. When the second cross piece is folded up against the vertical piece, the second cross piece lies parallel to the longitudinal axis of the vertical piece and a second end of the second cross piece and the second end of the vertical piece are even. The first and second cross pieces each have a gusset, which gussets are secured one each on the first ends of each of the first and second cross pieces on the side of the first and second cross pieces opposite the hinges. When the first and second cross pieces are lowered to being perpendicular to the longitudinal axis of the vertical piece, the gussets rest against the vertical piece and help brace and hold the first and second cross pieces in place.

The mobile sign carrier has four sliding brackets. Permanently attached to each sliding bracket is a square, flat piece or sign attachment piece, with one point of the sign attachment piece extending beyond the end of the sliding bracket creating a lip between the sliding bracket and the sign attachment piece. One of the sliding brackets mounts on each of the cross pieces with the extended point of the sign attachment piece facing the intersection of the cross pieces and the vertical piece. One sliding bracket mounts onto the vertical piece at the first end with the extended sign attachment piece facing upwards relative to the longitudinal axis of the vertical piece, and one sliding bracket mounts onto the second end of the vertical piece with the sign attachment piece facing downwards relative to the longitudinal axis of the vertical piece. When the first and second cross pieces are situated perpendicular to the vertical piece, the sliding brackets make a diamond shape having an empty space as between them where the sign(s) displayed by the mobile sign carrier is mounted. On the side of each of the sliding brackets opposite to the sign attachment piece a fastener is provided, which fastener secures the sliding brackets in place on the first and second cross pieces and the vertical piece to accommodate the particular sign being displayed. When all four sliding brackets are mounted in place and the cross pieces extended, the sign attachment pieces are all facing the same side of the mobile sign carrier.

When not extended, such as when the vehicle is in transit, or the signage is not in use, the second ends of the cross pieces are secured to the second end of vertical piece by fasteners. Night reflective tape is provided, which night reflective tape is placed on three sides of the mobile sign carrier.

In another embodiment for use on a vehicle such as a pick-up truck having a tailgate, a tailgate securing device is provided, which tailgate securing device has a first end and a second end. The tailgate securing device attaches to the vertical piece by a fastener being placed through a hole through the vertical piece and a hole on the first end of the tailgate securing device. The tailgate securing device has a tailgate bracket fastener attached to the second end thereof, which tailgate bracket fastener has a lip that rests over the upper edge of the tailgate. The securing device is coated with protective coating to protect the tailgate from scratching.

In another embodiment for use with fabric signs that have a handle or extension on the lower end thereof, a sliding bracket adapter is provided, which sliding bracket adapter fits over the sign attachment piece and is attached to the sliding bracket on the first end of the vertical piece. The sliding bracket adapter has an opening into which the handle or extension of the fabric sign slides and is attached thereto by a fastener.

A method of using a mobile sign carrier with a vehicle is provided. At the desired work site, the mobile sign carrier is attached to the vehicle in one embodiment by sliding the base of the mobile sign carrier onto the receiver arm of the hitch, securing the base thereto, sliding the receiver arm into the framed hitch opening and securing the receiver arm of the hitch thereto, or, in a second embodiment, sliding the base directly into the framed hitch opening of the hitch on the vehicle and securing the base to the hitch. In both embodiments of the base, the vertical piece is then secured to the base by placing the first end of the vertical piece into the base and attaching the first end of the vertical piece to the base by placing a fastener through holes through the base and a corresponding hole through the first end of the vertical piece, and attaching safety chains between the vertical piece and the hitch. A strobe light is mounted on the second end of the vertical piece, which strobe light is wired through a trailer connector at rear of the vehicle.

The mobile sign carrier is further configured for signage attachment by releasing the second ends of the cross pieces attached to the second end of the vertical piece and lowering cross pieces on the hinges until the gussets on the cross pieces abut the vertical piece so as to create a cross design relative to the vertical piece. The four sliding brackets with the permanently attached sign attachment pieces are adjusted on the cross pieces and the vertical piece such that the sign being mounted fits between the lip and each sliding bracket, the sign being displayed is mounted, and the sliding brackets are secured in place with the sign being displayed by the mobile sign carrier. When work is completed at the work site, following the above-steps in reverse order take down the sign and disassemble the mobile sign carrier for transport and storage.

These and other objects of the present invention will become apparent from a reading of the following specification taken in conjunction with the enclosed drawings.

BRIEF DESCRIPTION OF THE DRAWINGS

The above and other features and aspects of the present invention will become more apparent upon reading the following detailed description in conjunction with the accompanying drawings, in which.

DESCRIPTION OF PERFERRED EMBODIMENT

Figure 1:
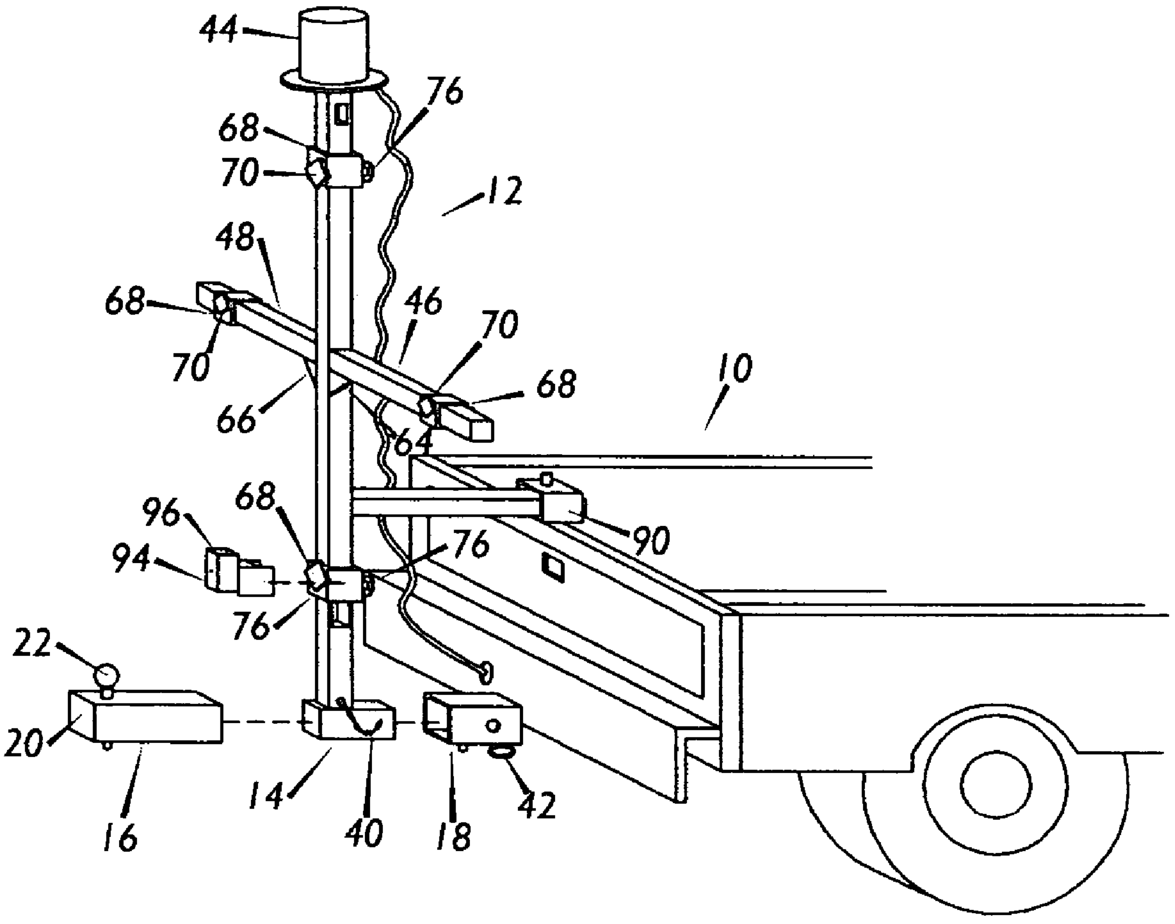
FIG. 1 shows a perspective view of a mobile sign carrier in accordance with the principles of the present invention in relative position for attachment to a vehicle using a base that attaches to a hitch receiver arm on the vehicle.
Figure 2:
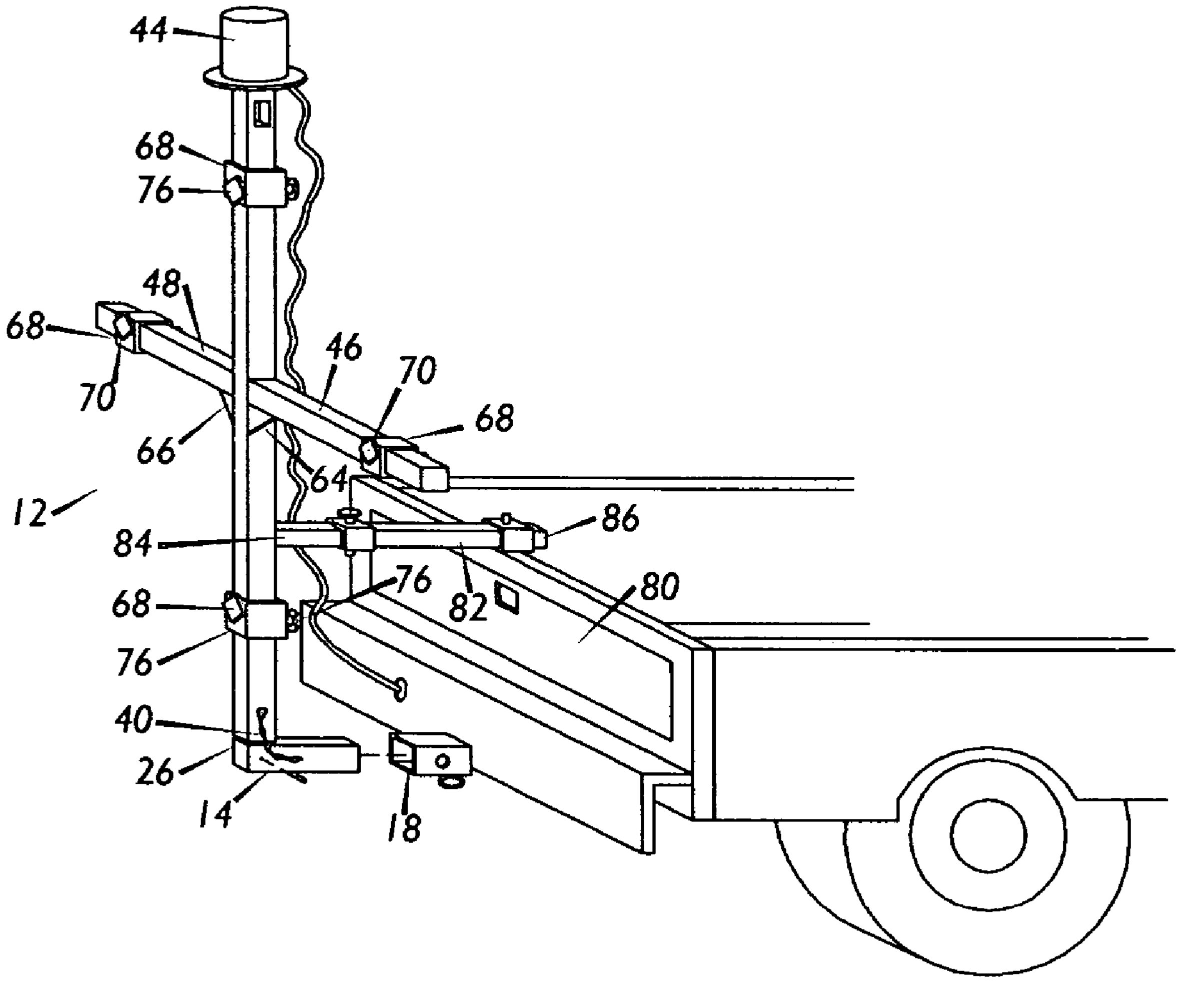
FIG. 2 shows a perspective view of a mobile sign carrier in accordance with the principles of the present invention in relative position for attachment to a vehicle using a receiver base that attaches to a receiver hitch framed opening on the vehicle.
Figure 3:
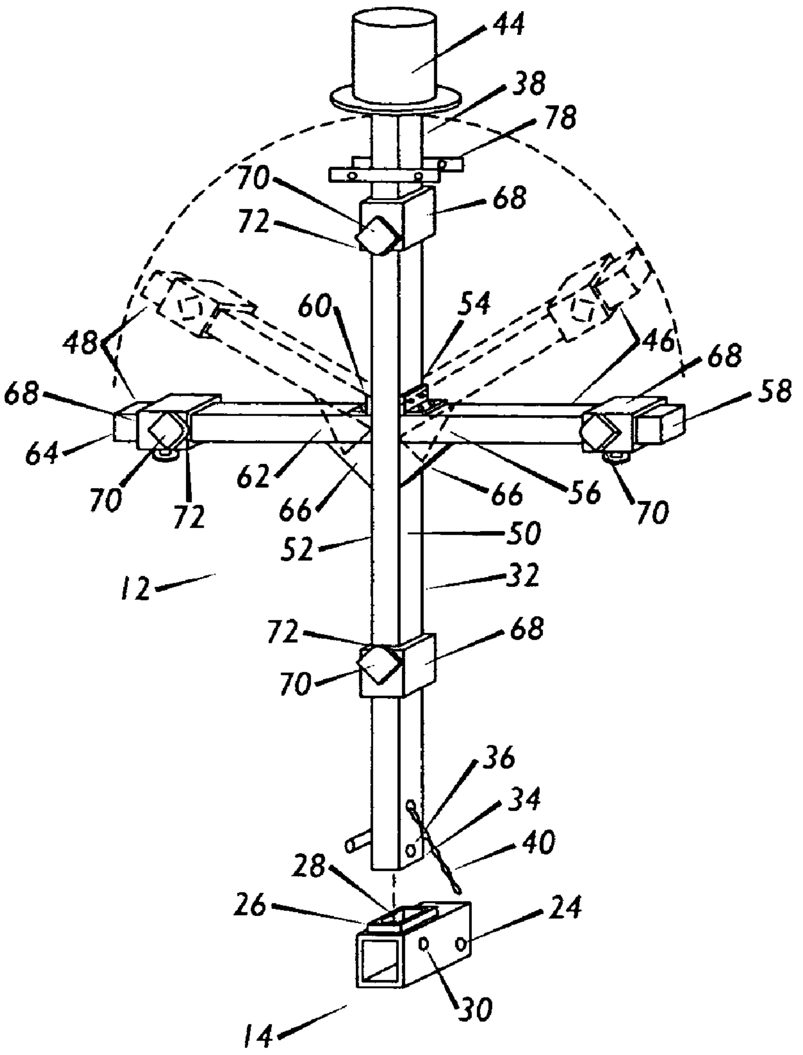
FIG. 3 shows a perspective view of a mobile sign carrier in accordance with the principles of the present invention illustrating the cross pieces movement relative to the vertical piece for sign attachment configuration; and, FIG. 4 shows a perspective view of a mobile sign carrier in accordance with the principles of the present invention illustrating a sign attached to the sliding brackets on the vertical piece and the cross pieces.
Figure 4:
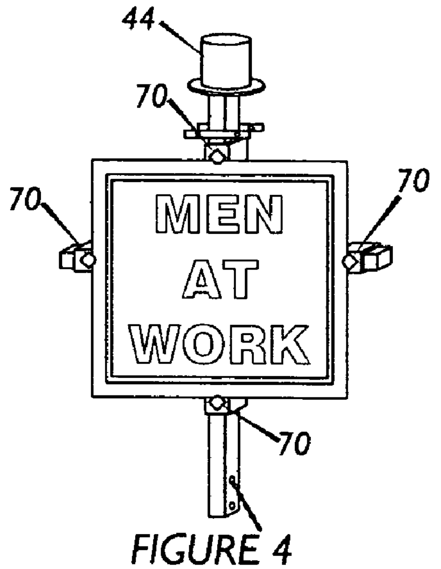

FIGS. 1-4 show a vehicle 10 with a mobile sign carrier 12 relatively placed for attachment to the vehicle 10. The mobile sign carrier 12 is made of tubing or other appropriate structural materials, and has a base 14 that attaches to a typical receiver hitch 16 on the vehicle 10. A typical receiver hitch or trailer hitch 16 on a vehicle 10 has a framed opening 18 mounted on and secured to the vehicle 10 and a receiver arm 20 which slides into the framed opening 18 and is fastened thereto by means of a pin or other fastening device. The receiver arm typically has mounted thereon a towing ball 22. In one embodiment, the base 14 directly slides into the hitch framed opening 18 and is fastened thereto. In another embodiment, the base 14 provides for using the mobile sign carrier 12 with a towing ball 22 on the receiver arm 20, which base 14 is slid over the receiver arm 20 between the towing ball 22 and the hitch framed opening 18 and secured to the receiver arm 20 with a fastener such as a pin through pre-drilled holes 24 in the side of the base 14, and which receiver arm 20 with the secured base 14 is then slid into the hitch framed opening 18 and fastened thereto.

Both above-described embodiments of the base 14 have a piece of tubing 26 attached to the top of the base 14 with an opening 28 on the top and pre-drilled holes 30 on two sides. The mobile sign carrier 12 has a vertical piece 32, which vertical piece 32 has a first end 34 that slides into the opening 28 on the top of the base 14 and attaches thereto by a fastener being placed through the pre-drilled holes 30 through the base 14 and a corresponding hole 36 through the first end 34 of the vertical piece 32. The vertical piece 32 has a second end 38. A plurality of two safety chains 40 are provided, which safety chains 40 are fastened to two sides of the vertical piece 32 and mounted into a safety chain holder 42 on the receiver hitch 16. A removable strobe light 44 is provided, which removable strobe light 44 is mounted on the second end 38 of the vertical piece 32, and which removable strobe light 44 is wired through a trailer electrical connector at rear of the vehicle.

The mobile sign carrier 12 has a first cross piece 46 and a second cross piece 48, which first cross piece 46 is attached to a first longitudinal side 50 of the vertical piece 32, and which second cross piece 48 is attached to a second longitudinal side 52 of the vertical piece 32. The first cross piece 46 is attached to the first longitudinal side 50 of the vertical piece 32 by a first hinge 54 attached to the vertical piece 32 and a first end 56 of the first cross piece 46. When the first cross piece 46 is folded upward against the vertical piece 32 by the first hinge 54, the first cross piece 46 lies parallel to the first longitudinal side 50 axis of the vertical piece 32 and a second end 58 of the first cross piece 46 and the second end 38 of the vertical piece 32 are even. The second cross piece 48 is attached to the second longitudinal side 52 of the vertical piece 32 by a second hinge 60 attached to the vertical piece 32 and a first end 62 of the second cross piece 48. When the second cross piece 48 is folded upward against the vertical piece 32 by the second hinge 60, the second cross piece 48 lies parallel to the second longitudinal side 52 axis of the vertical piece 32 and a second end 64 of the second cross piece 48 and the second end 38 of the vertical piece 32 are even. The first cross piece 46 and the second cross piece 48 each have a gusset 66, which gussets 66 are secured one each on the first ends 56, 62 of each of the first cross piece 46 and the second cross piece 48 on the side of the first cross piece 46 and second cross piece 48 opposite the hinges 54, 60. When the first cross piece 46 and the second cross piece 48 are lowered to being perpendicular to the longitudinal axis of the vertical piece 32, the gussets 66 rest against the vertical piece 32 and help brace and hold the first cross piece 46 and the second cross piece 48 in place.

The mobile sign carrier 12 has a plurality of four sliding brackets 68. Permanently attached to each sliding bracket 68 is a square, flat piece or sign attachment piece 70, with one point 72 of the sign attachment piece 70 extending beyond the sliding bracket 68 creating a lip between the sliding bracket 68 and the sign attachment piece 70. One of the sliding brackets 68 mounts on each of the first cross piece 46 and the second cross piece 48 with the extended point 72 of the sign attachment piece 70 facing the intersection of the cross pieces 46, 48 and the vertical piece 32. One sliding bracket 68 mounts onto the vertical piece 32 at the first end 34 with the extended point 72 of the sign attachment piece 70 facing upwards relative to the longitudinal axis of the vertical piece 32, and one sliding bracket 68 mounts onto the vertical piece 32 the second end 38 with extended point 72 of the sign attachment piece 70 facing downwards relative to the longitudinal axis of the vertical piece 32. When the first cross piece 46 and the second cross piece 48 are situated perpendicular to the vertical piece 32, the sliding brackets 68 on the cross pieces 46, 48 and the vertical piece 32 together form a diamond shape on the mobile sign carrier 12 and have an empty space as between them where the sign(s) displayed by the mobile sign carrier 12 is mounted. On the side of each of the sliding brackets 68 opposite to the sign attachment piece 70 a fastener 76 is provided, which fastener 76 secures the sliding brackets 68 in place on the first cross piece 46, the second cross piece 48 and the vertical piece 32 to accommodate the particular sign being displayed. When all four sliding brackets 68 are mounted in place and the first cross piece 46 and the second cross piece 48 extended, the sign attachment pieces 70 are all facing the same side of the mobile sign carrier 12.

When not extended, such as when the vehicle 10 is in transit, or the signage is not in use, the second end 58 of the first cross piece 46 and the second end 64 of the second cross piece 48 are secured to the second end 38 of vertical piece 32 by fasteners 78. Night reflective tape may be attached, which night reflective tape may be placed on three sides of the mobile sign carrier 12.

In another embodiment for use on a vehicle 10 such as a pick-up truck having a tailgate 80, a tailgate securing device 82 is provided, which tailgate securing device 82 has a first end 84 and a second end 86. The tailgate securing device 82 attaches to the vertical piece 32 by a fastener being placed through a hole through the vertical piece 32 and a hole on the first end 84 of the tailgate securing device 82. The tailgate securing device 82 has a tailgate bracket fastener 90 attached to the second end 86 thereof, which tailgate bracket fastener 90 has a lip that rests over the upper edge of the tailgate 80. The tailgate securing device 82 may be coated with protective coating to protect the tailgate 80 from scratching.

In another embodiment for use with fabric signs that have a handle or extension on the lower end thereof, a sliding bracket adapter 94 is provided, which sliding bracket adapter 94 fits over the sign attachment piece 70 and is attached to the sliding bracket 68 on the first end 34 of the vertical piece 32. The sliding bracket adapter 94 has an opening 96 into which the handle or extension of the fabric sign slides and is attached thereto by a fastener.

A method of using a mobile sign carrier 12 with a vehicle 10 is provided. At the desired work site, the mobile sign carrier 12 is attached to the vehicle 10 in one embodiment by sliding the base 14 of the mobile sign carrier 12 onto the receiver arm 20 of the receiver hitch 16, securing the base 14 to the receiver arm 20, sliding the receiver arm 20 into the framed hitch opening 18 and securing the receiver arm 20 of the receiver hitch 16 thereto, or, in a second embodiment, sliding the base 14 directly into the framed hitch opening 18 of the receiver hitch 16 on the vehicle 10 and securing the base 14 to the receiver hitch 16. In both embodiments of the base 14, the vertical piece 32 is then attached to the base 32 by placing the first end 34 of the vertical piece 32 into a top opening 28 of the base 14 and securing the first end 34 of the vertical piece 32 to the base 14 by placing a fastener through holes through the base 32 and a corresponding hole 36 through the first end 34 of the vertical piece 32, and attaching a plurality of two safety chains 40 between and to the vertical piece 32 and the receiver hitch 16. A strobe light 44 may be mounted on the second end 38 of the vertical piece 32, which strobe light 44 is wired through a trailer connector at rear of the vehicle 10.

The mobile sign carrier 12 is further configured for signage attachment by releasing the second end 58 of the first cross piece 46 and the second end 64 of the second cross piece 48 from the second end 38 of the vertical piece 32 and lowering the first cross piece 46 and the second cross piece 48 on the hinges 54, 60 until the gussets 66 on the first and second cross pieces 46, 48 abut the vertical piece 32 so as to create a cross design relative to the vertical piece 32. The four sliding brackets 68 with the attached sign attachment pieces 70 are adjusted on the first and second cross pieces 46, 48 and the vertical piece 32 such that the sign being mounted fits between the lip and each sliding bracket 68, the sign being displayed is mounted, and the sliding brackets 68 are secured in place with the sign then being displayed by the mobile sign carrier 12. When work is completed at the work site, following the above-steps in reverse order take down the sign and disassemble the mobile sign carrier 12 for transport and storage.

Various changes and departures may be made to the invention without departing from the spirit and scope thereof. Accordingly, it is not intended that the invention be limited to that specifically described in the specification or as illustrated in the drawings but only as set forth in the claims. From the drawings and above-description, it is apparent that a mobile sign carrier constructed in accordance with the invention herein provides desirable features and advantages. While the form of the invention herein described constitutes a preferred embodiment of the invention, it is to be understood that the invention herein is capable of further modification, and this application is intended to cover any variations, uses, or adaption of the invention herein, following in general the principles of the invention herein and include such departures from the present disclosure as to come within knowledge or customary practice in the art to which the invention herein pertains, and as may be applied to the essential features hereinbefore set forth and falling within the scope of the invention herein or the limits of the appended claims.

What is claimed is:

1. A mobile sign carrier for use with a vehicle having a trailer hitch, comprising:

a base, said base attaching to the trailer hitch by sliding into a hitch framed opening on the trailer hitch and being fastened thereto;

said base having a piece of tubing attached to the top, said piece of tubing having an opening on the top and pre-drilled holes on two sides;

a vertical piece, said vertical piece having a first end that slides into the opening on the top of the base and attaches thereto by a fastener being placed through the pre-drilled holes through the base and a corresponding hole through the first end of the vertical piece;

said vertical piece having a second end;

a plurality of two safety chains, said safety chains being fastened to and between the vertical piece and a safety chain holder on a receiver hitch of the vehicle;

a removable strobe light, said removable strobe light being mounted on the second end of the vertical piece and being wired through a trailer electrical connector at rear of the vehicle;

a first cross piece, said first cross piece being attached to a first longitudinal side of the vertical piece by a first hinge attached to the vertical piece and a first end of the first cross piece;

a second cross piece, said second cross piece being attached to a second longitudinal side of the vertical piece by a second hinge attached to the vertical piece and a first end of the second cross piece;

said first cross piece having a gusset, said gusset being attached on the first end of the first cross piece on the side of the first cross piece opposite the first hinge;

said second cross piece having a gusset, said gusset being attached on the first end of the second cross piece on the side of the second cross piece opposite the second hinge;

said gussets resting against the vertical piece and helping brace and hold the first cross piece and the second cross piece in place when the first cross piece and the second cross piece are lowered to being perpendicular to the longitudinal axis of the vertical piece;

a plurality of four sliding brackets, said sliding brackets being mounted one each on the first cross piece, the second cross piece, the vertical piece at the first end, and the vertical piece at the second end;

said sliding brackets each having a sign attachment piece attached thereto, said sign attachment pieces each having an extended point facing the intersection of the first cross piece, the second cross piece and the vertical piece;

said extended point of each of said sign attachment pieces extending beyond the sliding bracket creating a lip between the sliding bracket and the sign attachment piece;

said sliding brackets each having a fastener, said fastener being one each on the side of each of the sliding brackets opposite the sign attachment piece;

said fasteners securing the sliding brackets in place on the first cross piece, the second cross piece and the vertical piece; and, said second end of the first cross piece and said second end of the second cross piece being secured to the second end of the vertical piece each by a fastener.

2. The mobile sign carrier for use with a vehicle having a trailer hitch of claim 1, further comprising: said base sliding over a trailer hitch receiver arm between a towing ball on the trailer hitch and the hitch framed opening; said base being secured to the receiver arm with a fastener through pre-drilled holes in the base; and, said receiver arm with the secured base being slid into the hitch framed opening of the trailer hitch and fastened thereto.

3. The mobile sign carrier for use with a vehicle having a trailer hitch of claim 1, further comprising: a tailgate securing device, said tailgate securing device having a first end and a second end; said tailgate securing device attaching to the vertical piece by a fastener being placed through a hole through the vertical piece and a hole on the first end of the tailgate securing device; said tailgate securing device having a tailgate bracket fastener, said tailgate bracket fastener attaching to the second end of the tailgate securing device and having a lip that rests over the upper edge of a tailgate; and said tailgate securing device being coated with a protective coating to protect the tailgate from scratching.

4. The mobile sign carrier for use with a vehicle having a trailer hitch of claim 2, further comprising: a tailgate securing device, said tailgate securing device having a first end and a second end; said tailgate securing device attaching to the vertical piece by a fastener being placed through a hole through the vertical piece and a hole on the first end of the tailgate securing device; said tailgate securing device having a tailgate bracket fastener, said tailgate bracket fastener attaching to the second end of the tailgate securing device and having a lip that rests over the upper edge of a tailgate; and said tailgate securing device being coated with a protective coating to protect the tailgate from scratching.

5. The mobile sign carrier for use with a vehicle having a trailer hitch of claim 1, further comprising: said sliding bracket on the first end of the vertical piece having a sliding bracket adapter for use with fabric signs having a handle or extension on a lower end thereof, said sliding bracket adapter fitting over the sign attachment piece and attaching to the sliding bracket; and, said sliding bracket adapter having an opening into which the handle or extension of the fabric sign slides and is attached.

6. The mobile sign carrier for use with a vehicle having a trailer hitch of claim 2, further comprising: said sliding bracket on the first end of the vertical piece having a sliding bracket adapter for use with fabric signs having a handle or extension on a lower end thereof, said sliding bracket adapter fitting over the sign attachment piece and attaching to the sliding bracket; and, said sliding bracket adapter having an opening into which the handle or extension of the fabric sign slides and is attached.

* * * * *